(No Model.)
C. C. DONNEL & G. W. DICKEY.
ADJUSTABLE GATE FOR STOCK YARDS.
No. 575,505. Patented Jan. 19, 1897.
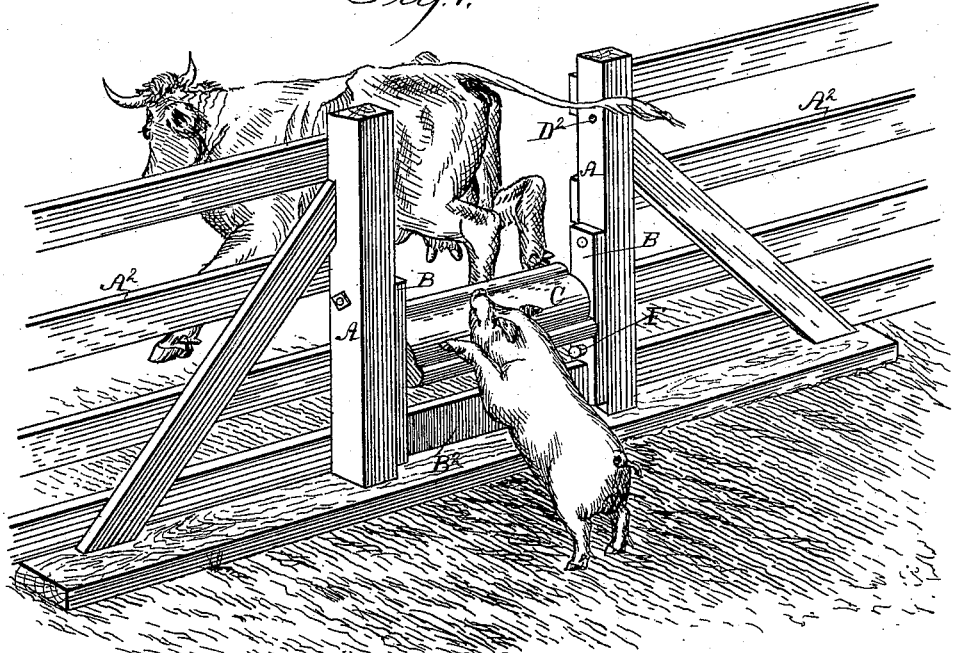
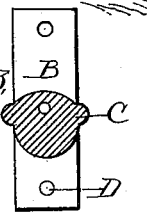
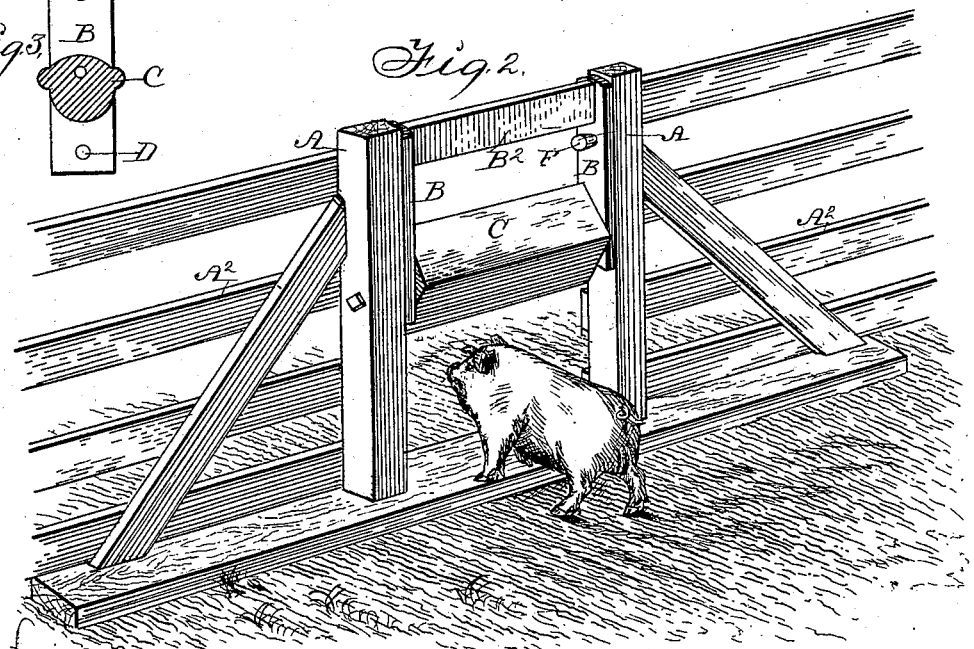

UNITED STATES PATENT OFFICE.

CASSIUS C. DONNEL, OF OTLEY, AND GEORGE W. DICKEY, OF DES MOINES, IOWA.

ADJUSTABLE GATE FOR STOCK-YARDS.

SPECIFICATION forming part of Letters Patent No. 575,505, dated January 19, 1897.

Application filed March 14, 1896. Serial No. 583,272. (No model.)

*To all whom it may concern:*

Be it known that we, CASSIUS C. DONNEL, residing at Otley, in the county of Marion, and GEORGE W. DICKEY, residing at Des Moines, in the county of Polk, State of Iowa, citizens of the United States, have invented a new and useful Adjustable Gate for Stock-Yards, of which the following is a specification.

The objects of our invention are, first, to provide a stock-gate that may be made to exclude smaller animals, such as swine, and permit larger animals, such as horses and cattle, to pass thereover, or be quickly and easily adjusted to exclude the larger animals and allow the smaller ones to pass, and our object is, further, to provide a top piece for said gate, when used to exclude smaller animals, that will, when an animal places his fore feet upon one of the ridges or corners thereof, turn and throw the animal's feet off from the said top piece and strike its nose with a like ridge or corner.

Our invention consists in the construction of a gate having a ridged or angular cross-piece pivoted eccentrically between two side pieces and a cross-piece fixed to and extended between said side pieces, and in pivoting the frame or gate thus formed, at its top, between two stationary posts, so that the fixed cross-piece will normally lie close to the ground-surface, but may be swung upwardly and supported in position to allow smaller animals to pass under, as hereinafter set forth, pointed out in our claims, and illustrated in the accompanying drawings, in which—

Figure 1 is a perspective view showing the gate adjusted to exclude smaller animals and permit larger ones to pass. Fig. 2 is a like view showing the gate adapted to exclude larger animals and permit smaller animals to pass, and Fig. 3 is a sectional view showing the roller and its pivotal connection with the side pieces.

Referring to the accompanying drawings, the reference-letters A A indicate two posts located at suitable distances apart at the abutting ends of a fence $A^2$. B B indicate two side pieces pivotally connected with the inner surface of said posts at a suitable distance from the ground-surface. $B^2$ is a cross-piece fixed to the lower ends of said side pieces. C indicates a cross-piece pivoted eccentrically to the said side pieces above the fixed cross-piece and at such an elevation from the ground-surface that smaller animals, such as swine, will not be able to jump over it, and is provided with ridges or made angular, so that when an animal's feet are placed thereupon it will swing outwardly and throw the animal backward and cause one of the ridges or corners to strike the animal upon the nose.

The advantages gained by pivoting the cross piece or block eccentrically are that when the gate is in its normal position the cross-piece is placed at its proper height, and when swung upwardly the cross-piece will extend some distance lower than would a cross-piece pivoted concentrically, and when a larger animal steps over the cross-piece, if it should strike upon one of the corners, the cross-piece will swing with its side nearest to the pivotal point thereof toward the animal and save the animal from being scratched.

D indicates an opening formed in one of the side pieces B, and $D^2$ $D^2$ are openings formed in one of the posts A, adapted to coincide with the opening D when the gate is placed in either position, so that a pin F may be extended through the gate and post to securely retain the gate in either position.

Having thus described our invention, what we claim as new therein, and desire to secure by Letters Patent of the United States therefor, is—

1. A transformable gate, comprising two stationary uprights two side pieces pivoted at one end to said uprights, a cross-piece pivoted between said side pieces, a cross-piece for closing the space between the pivoted cross-piece and the other end of the side pieces, and means for securing the gate when extended either upwardly or downwardly from its pivotal point, for the purposes stated.

2. A transformable gate, comprising two stationary uprights, two side pieces pivoted at one end to the said uprights, a cross-piece having ridges extended longitudinally thereof eccentrically pivoted between said side pieces, a cross-piece fixed to the other end of said side pieces and means for holding the gate in an upwardly or downwardly extended position, constructed and arranged substantially as, and for the purposes stated.

C. C. DONNEL.
GEORGE W. DICKEY.

Witnesses as to the signature of C. C. Donnel:
W. M. LIVINGSTON,
A. B. LIVINGSTON.

Witnesses as to the signature of George W. Dickey.
J. RALPH ORWIG,
THOMAS G. ORWIG.